United States Patent
Rambo (10) Patent No.: US 11,614,037 B2
(45) Date of Patent: Mar. 28, 2023

(54) METHOD AND SYSTEM FOR BLEED FLOW POWER GENERATION

(71) Applicant: General Electric Company, Schenectady, NY (US)

(72) Inventor: Jeffrey Douglas Rambo, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/158,319

(22) Filed: Jan. 26, 2021

(65) Prior Publication Data

US 2022/0235713 A1     Jul. 28, 2022

(51) Int. Cl.
    *F02C 9/18*     (2006.01)
    *F02C 6/14*     (2006.01)
    *F02C 6/08*     (2006.01)

(52) U.S. Cl.
    CPC ............ *F02C 9/18* (2013.01); *F02C 6/08* (2013.01); *F02C 6/14* (2013.01); *F05D 2220/76* (2013.01); *F05D 2260/42* (2013.01); *F05D 2260/606* (2013.01); *F05D 2260/85* (2013.01); *F05D 2270/121* (2013.01); *F05D 2270/122* (2013.01); *F05D 2270/301* (2013.01); *F05D 2270/304* (2013.01)

(58) Field of Classification Search
    CPC ...... F02C 9/18; F02C 6/08; F02C 6/14; F02C 3/13; F05D 2220/76
See application file for complete search history.

(56) References Cited

U.S. PATENT DOCUMENTS

| | | | |
|---|---|---|---|
| 3,586,458 A | 6/1971 | Avery | |
| 3,662,975 A | 5/1972 | Driskill | |
| 4,841,726 A * | 6/1989 | Burkhardt | ............... F01D 11/24 |
| | | | 415/116 |
| 6,073,445 A | 6/2000 | Johnson | |
| 6,169,332 B1 * | 1/2001 | Taylor | ...................... F02C 6/14 |
| | | | 290/31 |
| 7,246,482 B2 | 7/2007 | Mahoney et al. | |
| 9,027,354 B2 | 5/2015 | Velez | |
| 10,364,750 B2 | 7/2019 | Rambo | |
| 2007/0147990 A1 * | 6/2007 | Kamimura | ............. F16J 15/445 |
| | | | 415/173.1 |
| 2013/0192216 A1 | 8/2013 | Berlin, Jr. et al. | |
| 2016/0032841 A1 * | 2/2016 | Ronan | ...................... F02C 9/18 |
| | | | 415/121.3 |
| 2016/0221684 A1 | 8/2016 | Ho et al. | |
| 2020/0025066 A1 | 1/2020 | Husband et al. | |

* cited by examiner

*Primary Examiner* — Katheryn A Malatek
(74) *Attorney, Agent, or Firm* — Dority & Manning, P.A.

(57) ABSTRACT

A method and system for bleed flow power generation is provided. The engine includes a core flowpath formed by a compressor section, a heat addition system, and an expansion section in serial flow arrangement. A bleed circuit is extended from the core flowpath to extract a portion of compressed fluid from the core flowpath. The method and system include bleeding compressed fluid through a bleed circuit extended in fluid communication from the core flowpath of the engine; flowing the compressed fluid through the bleed circuit to a turbine rotor positioned at the bleed circuit; extracting, via the turbine rotor, energy from the flow of compressed fluid across the turbine rotor; and receiving energy at an electric machine operably coupled to the turbine rotor.

15 Claims, 9 Drawing Sheets

┌─────────────────────────────────────────────────────────────────────┐
│ 1010 BLEEDING COMPRESSED FLUID THROUGH A BLEED CIRCUIT EXTENDED IN FLUID │
│      COMMUNICATION FROM THE CORE FLOWPATH OF THE ENGINE             │
└─────────────────────────────────────────────────────────────────────┘
                                  │
                                  ▼
┌─────────────────────────────────────────────────────────────────────┐
│ 1020 FLOWING THE COMPRESSED FLUID THROUGH THE BLEED CIRCUIT TO A TURBINE ROTOR │
│      POSITIONED AT THE BLEED CIRCUIT                                │
└─────────────────────────────────────────────────────────────────────┘
                                  │
                                  ▼
┌─────────────────────────────────────────────────────────────────────┐
│ 1030 EXTRACTING ENERGY FROM THE FLOW OF COMPRESSED FLUID ACROSS THE TURBINE ROTOR │
└─────────────────────────────────────────────────────────────────────┘
                                  │
                                  ▼
┌─────────────────────────────────────────────────────────────────────┐
│ 2010 COMPARING A SPEED OF THE TURBINE ROTOR TO AN OPERATING CONDITION OF THE ENGINE │
└─────────────────────────────────────────────────────────────────────┘
                                  │
                                  ▼
┌─────────────────────────────────────────────────────────────────────┐
│ 2020 DETERMINING WHETHER THE SPEED OF THE TURBINE ROTOR CORRESPONDS TO │
│      A PREDETERMINED SPEED RANGE BASED ON THE OPERATING CONDITION   │
└─────────────────────────────────────────────────────────────────────┘
                                  │
                                  ▼
┌─────────────────────────────────────────────────────────────────────┐
│ 1060 FLOWING THE COMPRESSED FLUID FROM THE TURBINE ROTOR TO THE EXPANSION │
│      SECTION OF THE ENGINE AFTER EXTRACTING ENERGY FROM THE COMPRESSED FLUID │
│      ACROSS THE TURBINE ROTOR                                       │
└─────────────────────────────────────────────────────────────────────┘
                                  │
                                  ▼
┌─────────────────────────────────────────────────────────────────────┐
│ 1070 SELECTIVELY BYPASSING AT LEAST A PORTION OF THE COMPRESSED FLUID FROM │
│      FLOWING THROUGH THE TURBINE ROTOR                              │
└─────────────────────────────────────────────────────────────────────┘
```

FIG. 11

METHOD AND SYSTEM FOR BLEED FLOW POWER GENERATION

FIELD

The present subject matter relates generally to methods and systems for power generation from gas turbine engines and propulsion systems.

BACKGROUND

Vehicles, such as aircraft and others at which gas turbine engines and propulsion systems are integrated, are requiring increasingly greater electric power to satisfy electrical power demands. For instance, electrification of aircraft subsystems may include actuators, environmental control systems, thermal management systems, anti-icing heaters and flow devices, and electric powertrain thrust generation. Certain systems may include direct connections to a spool of the engine, such as to generate energy at an accessory gear assembly via a mechanical coupling to the spool. However, such systems remove efficiency from the spools for generating thrust.

As such, there is a need for power generation systems and methods that generate electric energy while mitigating or eliminating losses related to mechanical power extraction. Additionally, there is a need for methods and power generation systems that perform leak detection or failure detection that mitigates or eliminates losses related to power extraction from a gas turbine engine.

BRIEF DESCRIPTION

Aspects and advantages of the invention will be set forth in part in the following description, or may be obvious from the description, or may be learned through practice of the invention.

An aspect of the present disclosure is directed to a method and system for bleed flow power generation is provided. The engine includes a core flowpath formed by a compressor section, a heat addition system, and an expansion section in serial flow arrangement. A bleed circuit is extended from the core flowpath to extract a portion of compressed fluid from the core flowpath. The method and system include bleeding compressed fluid through a bleed circuit extended in fluid communication from the core flowpath of the engine; flowing the compressed fluid through the bleed circuit to a turbine rotor positioned at the bleed circuit; extracting, via the turbine rotor, energy from the flow of compressed fluid across the turbine rotor; and receiving energy at an electric machine operably coupled to the turbine rotor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a bleed flow power generation system are provided herein, and methods for power generation and failure detection. Embodiments of the power generation systems and method may generate electric energy while mitigating or eliminating losses related to mechanical power extraction. Additionally, embodiments provided herein allow for leak detection or failure detection that mitigates or eliminates losses related to power extraction from a gas turbine engine.

Embodiments provided herein include a turbine rotor positioned at a bleed circuit extended from a compressor section of an engine. The turbine rotor is operably coupled to an electric machine to generate energy. Energy may be stored at an energy storage device, or discharged to one or more subsystems at the engine, an aircraft, or other vehicle. Embodiments of the system and method provided herein provide benefits over known methods and structures that may dump excess bleed air overboard (e.g., to atmospheric condition). Embodiments provided herein generate useful energy and work and may further provide desirable alternatives to thermoelectric power generation.

Figure 1:
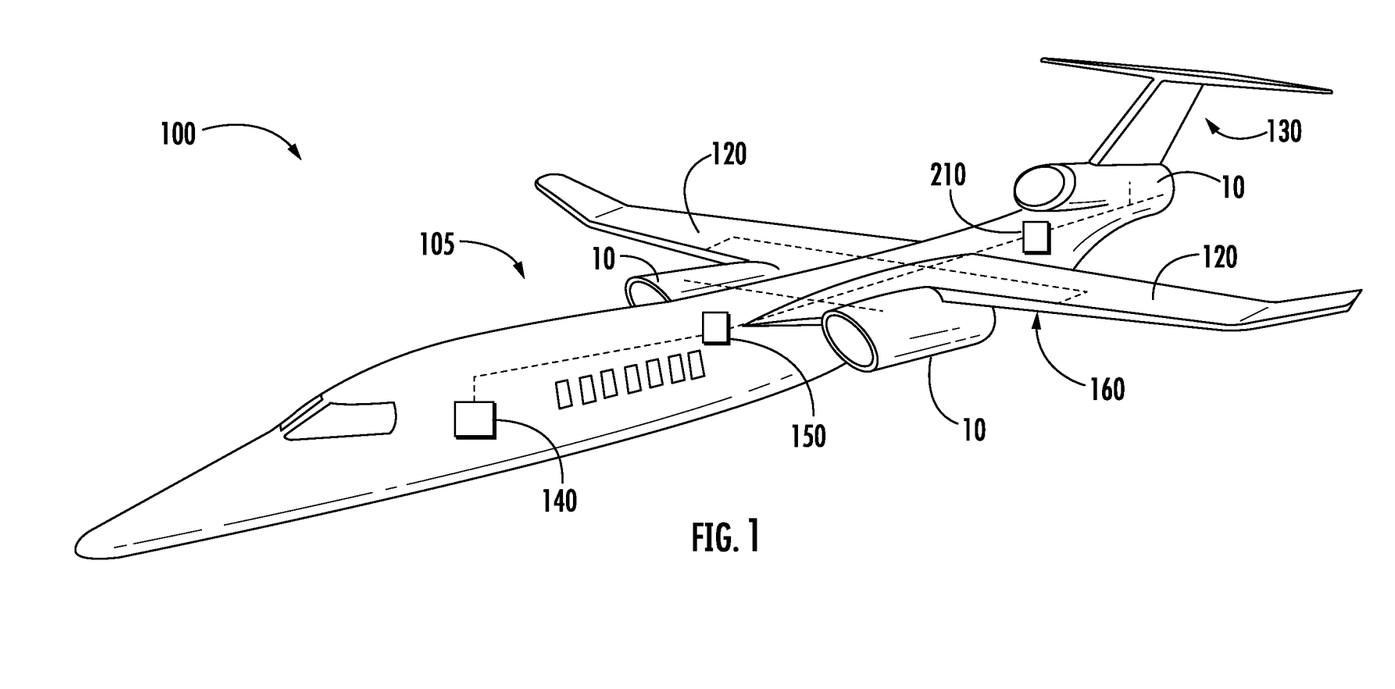
FIG. 1 is an exemplary embodiment of a vehicle including a power generation system according to aspects of the present disclosure.

Referring now to the drawings, in FIG. 1, an exemplary embodiment of a vehicle 100 including an engine 10 and a power generation system 60 according to aspects of the present disclosure is provided. In an embodiment, the vehicle 100 is an aircraft including an aircraft structure or airframe 105. The airframe 105 includes a fuselage 110 to which wings 120 and an empennage 130 are attached. The engine 10 according to aspects of the present disclosure is attached to one or more portions of the airframe.

In certain instances, the engine 10 is attached to an aft portion of the fuselage 110. In certain other instances, the engine 10 is attached underneath, above, or through the wing 120 and/or portion of the empennage 130. In various embodiments, the engine 10 is attached to the airframe 105 via a pylon or other mounting structure. In still other embodiments, the engine 10 is housed within the airframe, such as may be exemplified in certain supersonic military or commercial aircraft.

Various embodiments of the vehicle 100 include a computing system 140, such as avionics or other electronics or computing devices configured to control the vehicle 100 or the engine 10. The vehicle 100 may further include an environmental control system (ECS) 150, such as to provide thermally conditioned air to a cabin of the vehicle, the computing system 140, a vehicle surface anti-icing system 160, a propulsion system anti-icing system, or other system of the vehicle 100 or engine 10. In various embodiments such as described herein, the power generation system 60 may be configured to provide energy for operating one or more of the systems described herein.

Figure 2:
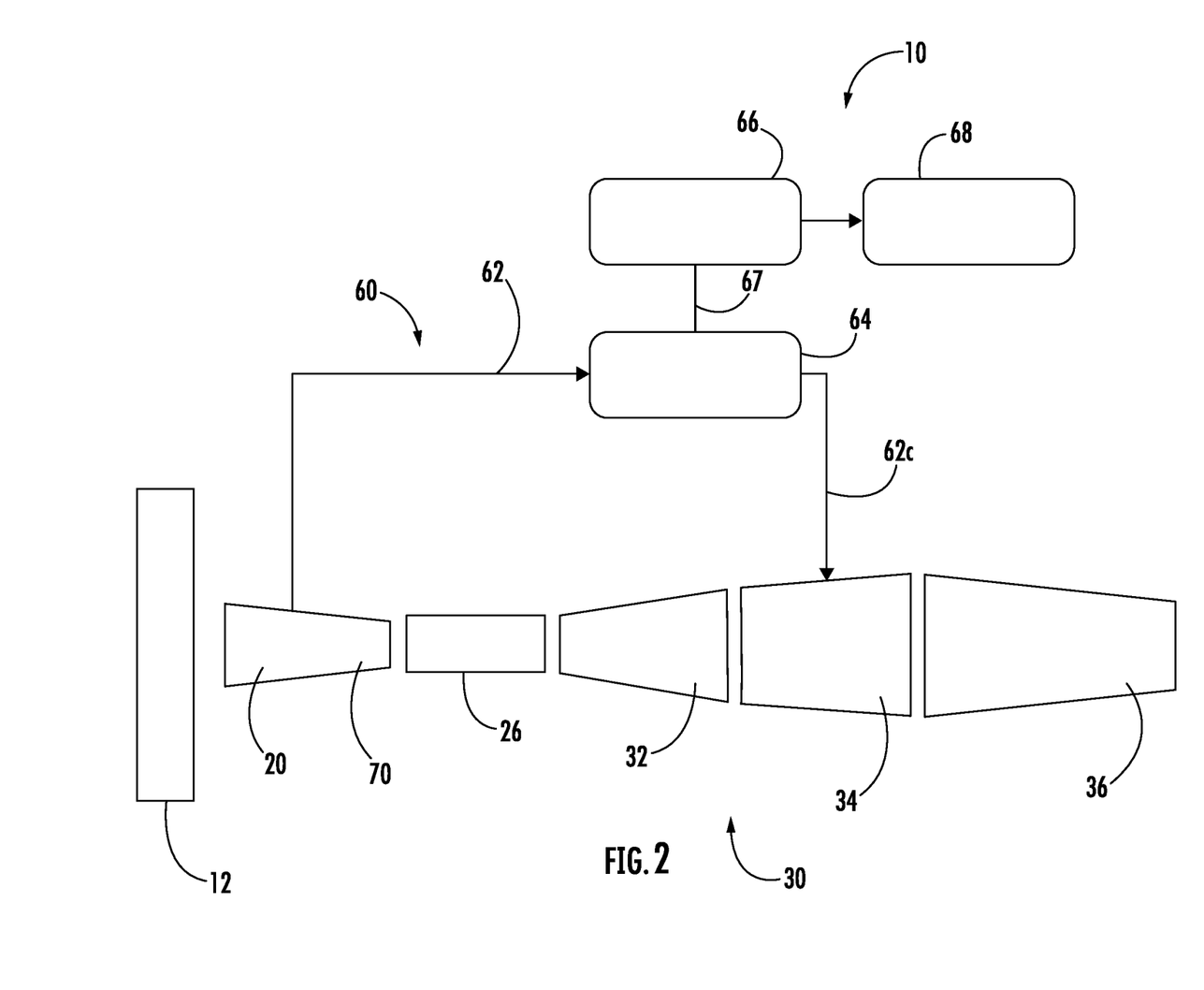
FIG. 2 is a schematic embodiment of the power generation system according to aspects of the present disclosure.

Referring now to FIG. 2, an exemplary schematic embodiment of the engine 10 and power generation system 60 at the vehicle 100 (FIG. 1) are provided. The engine 10 may generally be configured as a propulsion system or power generation system generally, such as for an auxiliary power unit (APU), a hybrid-electric engine, or other engine configuration. Particular embodiments of the engine 10 may be configured as a gas turbine engine or turbomachine, a ramjet engine, or a supersonic combustion ramjet (scramjet) engine. Still particular embodiments of the engine 10 may include a turbomachine configured as a turbofan, turboprop, turbojet, turboshaft, propfan, or open rotor engine. Certain embodiments of the engine 10 include a fan section 12, a compressor section 20, a heat addition or combustion section 26, an expansion section 30, and an exhaust section 36 in serial flow arrangement.

The heat addition system 26 may be configured as any suitable deflagrative and/or detonative combustion system. Such systems include, but are not limited to, annular, can, can-annular, dual-annular, trapped vortex combustion (TVC), or volute or scroll, or other deflagrative combustor configuration in either lean burn and/or rich burn configuration. Such systems may additionally, or alternatively, include rotating detonation, pulse detonation, or other detonative combustion systems, or combinations with deflagrative combustion systems.

The fan section 12 includes one or more stages of rotors and blades. One or more fan streams is positioned downstream of one or more stages of the rotors and blades. In certain embodiments, the fan stream is positioned aft of a first stage fan rotor, such as generally defining a fan bypass of a turbofan engine. In still certain embodiments, one or more fan streams is positioned aft of a second or more stage fan rotor (e.g., a low pressure compressor or booster), such as generally defining a third stream aerodynamically between the fan stream defining a fan bypass and a primary or core flowpath 70 through the compressor section 20, heat addition system 26, and expansion section 30.

The compressor section 20, the heat addition system 26, and the expansion section 30 are generally positioned in serial aerodynamic flow arrangement. The compressor section 20, the heat addition system 26, and the expansion section 30 may together define a core engine or gas generator of the engine 10. In certain embodiments, such as described herein, the compressor section 20 includes a high pressure compressor positioned in direct serial flow arrangement with the heat addition system 26 and a high pressure turbine 32 of the expansion section 30. A low pressure turbine 34 of the expansion section 30 may be operably coupled to the fan section 12 to drive the one or more stages of the fan section 12. In certain embodiments not depicted, the engine 10 may include an intermediate pressure compressor positioned aerodynamically between the fan section 12 and the high pressure compressor, an intermediate press turbine positioned aerodynamically between the high pressure turbine 32 and the low pressure turbine 34.

Figure 3:
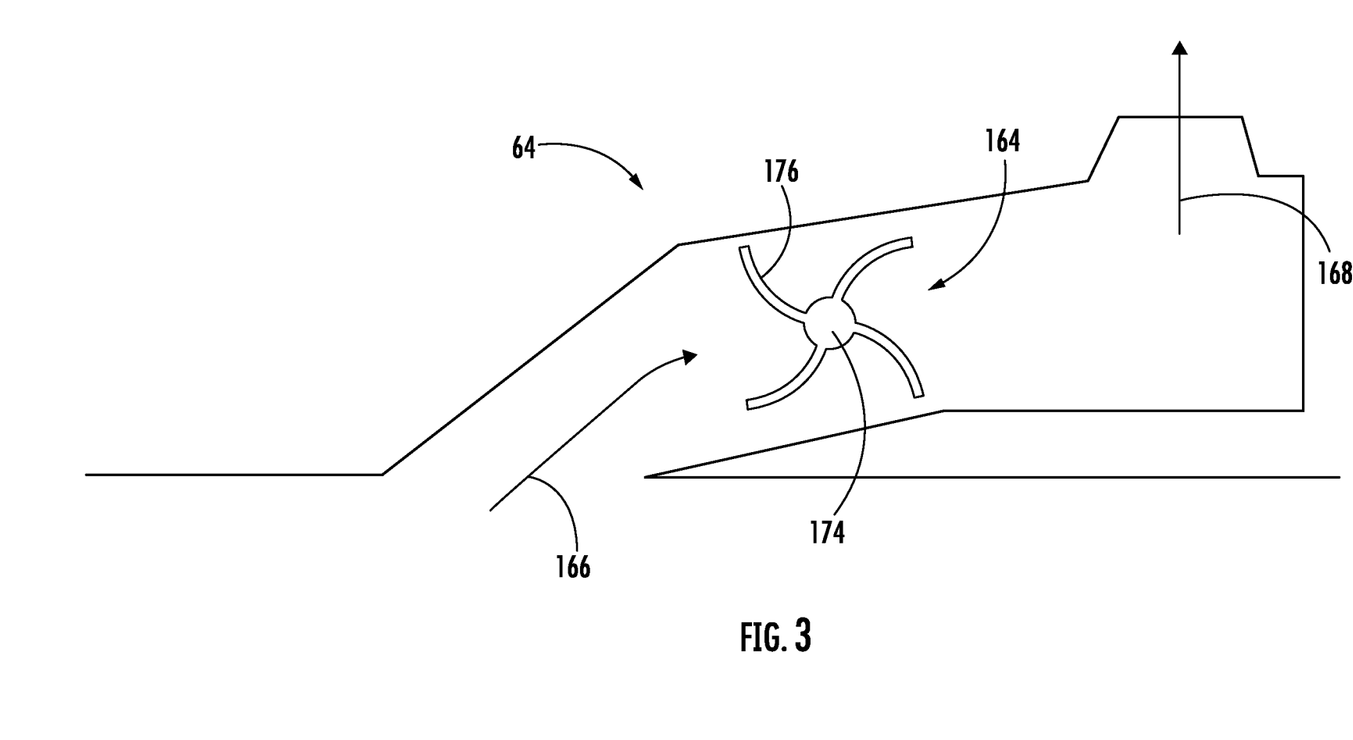
FIGS. 3-5 are schematic embodiments of a turbine assembly of the power generation system according to aspects of the present disclosure.
Figure 4:
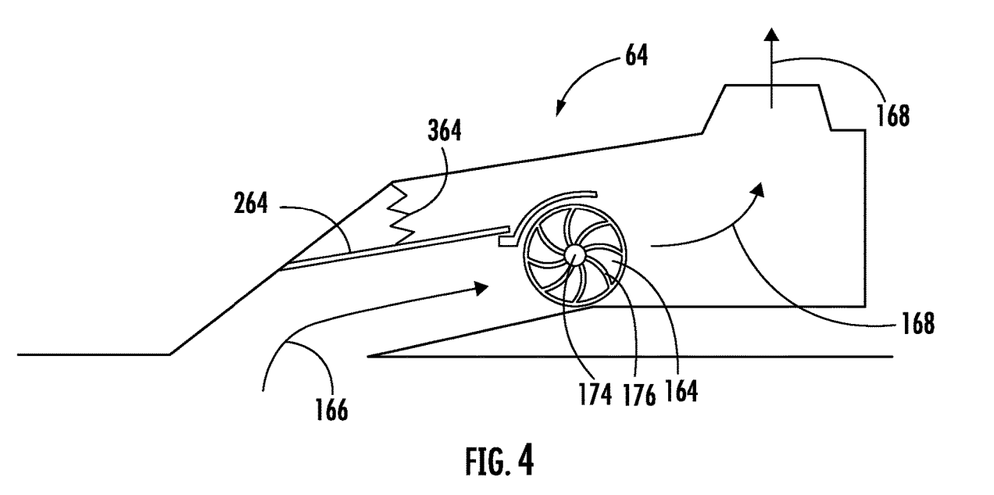
Figure 5:
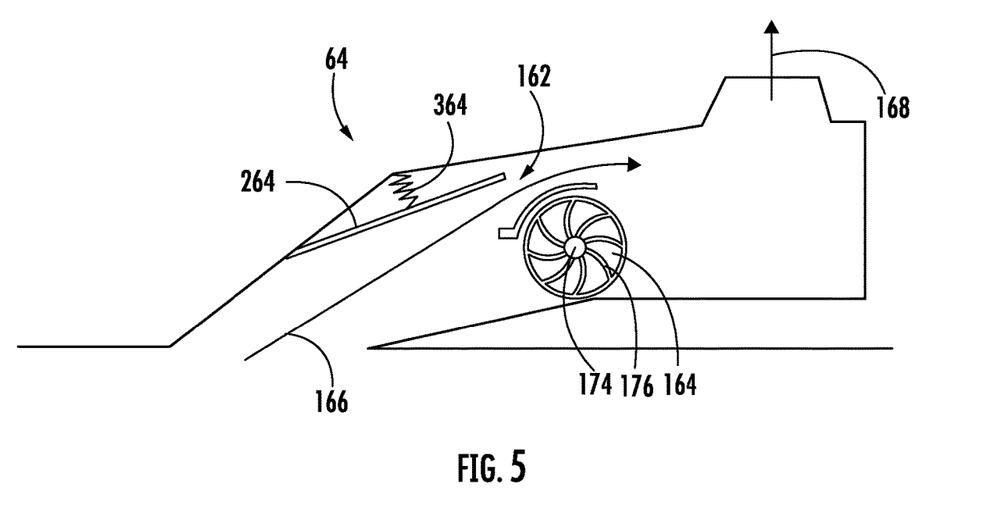

The power generation system 60 includes one or more embodiments of the engine 10 such as generally described above. The system 60 further includes a bleed circuit 62 extended in fluid communication from the core flowpath 70 of the engine 10 to a turbine housing 64 positioned at the bleed circuit 62. The bleed circuit 62 is configured to flow a portion of compressed fluid therethrough from the core flowpath 70. The turbine housing 64 includes a turbine rotor 164, such as depicted and described with regard to FIGS. 3-4. An electric machine 66 is operably coupled to the turbine rotor 164 (FIGS. 3-4) to receive energy via compressed fluid flowed across the turbine rotor 164 (FIGS. 3-4).

The bleed circuit 62 is generally a walled manifold, pipe, tube, or conduit extended in flow communication from the core flowpath 70 to provide a flow of compressed fluid, such as compressed oxidizer, or air in particularly, to the turbine rotor 164 (FIGS. 3-4) at the turbine housing 64. One embodiment of operation of the system 60 includes operating the engine 10 as a gas turbine engine to receive and compress the flow of fluid at the compressor section 20. The compressed flow of fluid is provided downstream from the compressor section 20 through the core flowpath 70 to the heat addition system 26. A flow of liquid and/or gaseous fuel is mixed with the compressed fluid at the heat addition system 26 to generate combustion gases. Hot combustion gases are provided downstream through the core flowpath 70 to the expansion section 30, wherein the combustion gases are expanded to generate thrust or motive energy for operating the fan section 12 and compressor section 20. The expanded combustion gases are flowed downstream through the exhaust section 36 and egresses the engine 10.

In particular embodiments, the engine 10 is configured as a propulsion system for an aircraft, such as, but not limited to, fixed-wing aircraft, rotary-wing aircraft, tilt-wing aircraft, or other appropriate aircraft. However, other embodiments of the engine 10 may be configured as a propulsion system for a land-based or sea-based vehicle. Operation of the system 60 includes determining a pressure threshold at or above which the operating condition is a high power operating condition and below which the operating condition is a low power operating condition. In certain embodiments, the operating conditions correspond to a landing and takeoff (LTO) schedule. The LTO schedule may include startup and ignition, ground and flight idle conditions as low power conditions. The LTO schedule may further include takeoff, climb-out, and approach operating conditions as high power conditions. A cruise condition (typically following climb-out and prior to approach, such as generally including a steady-state operating condition of the engine 10 during flight), is a low power operating condition relative to the pressure threshold for operation of the system 60.

During operation of the engine 10, a portion of the compressed fluid, such as compressed oxidizer or air, is extracted or bled from the compressor section 20 to the bleed circuit 62, and provided to the turbine housing 64. Referring briefly to FIGS. 3-4, a flow of compressed fluid received from the compressor section 20 (FIG. 2) enters the turbine housing 64, such as depicted schematically via arrows 166. Referring to FIG. 3, the flow of compressed fluid 166 is expanded through the turbine rotor 164, causing the turbine rotor 164 to rotate and generate energy at the electric machine 66 (FIG. 2). The expanded flow of fluid egresses the turbine rotor 164 and exits the turbine housing 64, such as depicted schematically via arrows 168. In various embodiments, such as further described herein, the flow of fluid 168 is then provided to the expansion section 30 at the engine 10.

Referring to FIGS. 3-4, in various embodiments, the turbine housing 64 includes a bypass wall 264 configured to selectively open and close based on an operating mode of the engine 10. The bypass wall 264 is configured to extend open to allow the compressed fluid 166 to at least partially bypass the turbine rotor 164 when the operating mode is at or above the pressure threshold. The bypass wall 264 is further configured to extend closed to disable the compressed fluid 166 from bypassing the turbine rotor 164 when the operating mode is below the pressure threshold, such as to allow substantially all of the compressed fluid 166 to expand across the turbine rotor 164 and generate energy at the electric machine 66 (FIG. 2).

In a particular embodiment, the bypass wall 264 is operably coupled to a spring 364. In certain embodiments, such as depicted in FIG. 3, the spring 364 is configured to push the bypass wall 264 to close a bypass passage 162 (FIG. 4), such as to direct the compressed fluid 166 to expand across the turbine rotor 164. In still certain embodiments, such as depicted in FIG. 4, the spring 364 is configured to allow the compressed fluid 166 to force the bypass wall 264 into an open position, forming the bypass passage 164 around the turbine rotor 164 and allowing at least a portion of the compressed fluid 166 to bypass the turbine rotor 164. A remaining portion of compressed fluid across the turbine rotor 164 may be diminished in energy, such as to disable rotation or energy transfer to the electric machine 66 (FIG. 2).

In various embodiments, certain operating conditions of the engine 10 provide the compressed fluid to the turbine housing 64 that determine whether the bypass wall 264 is open or closed. In a particular embodiment, low power operating conditions, such as described above, allow the bypass wall 264 to close, such as depicted in FIG. 3. In other embodiments, high power operating conditions, such as described above, allow the bypass wall 364 to open, such as depicted in FIG. 4.

Figure 7:
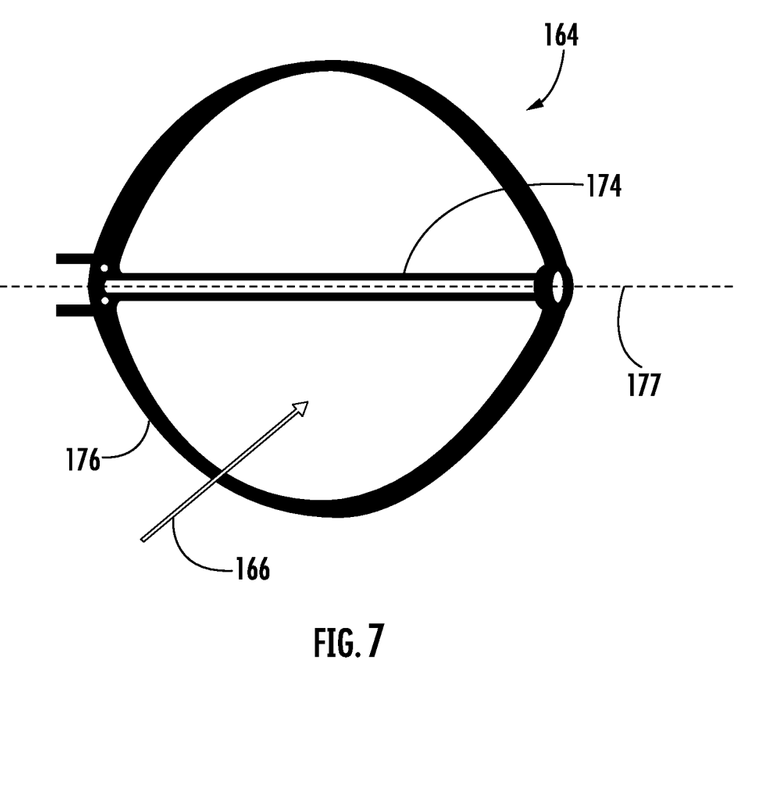
Figure 8:
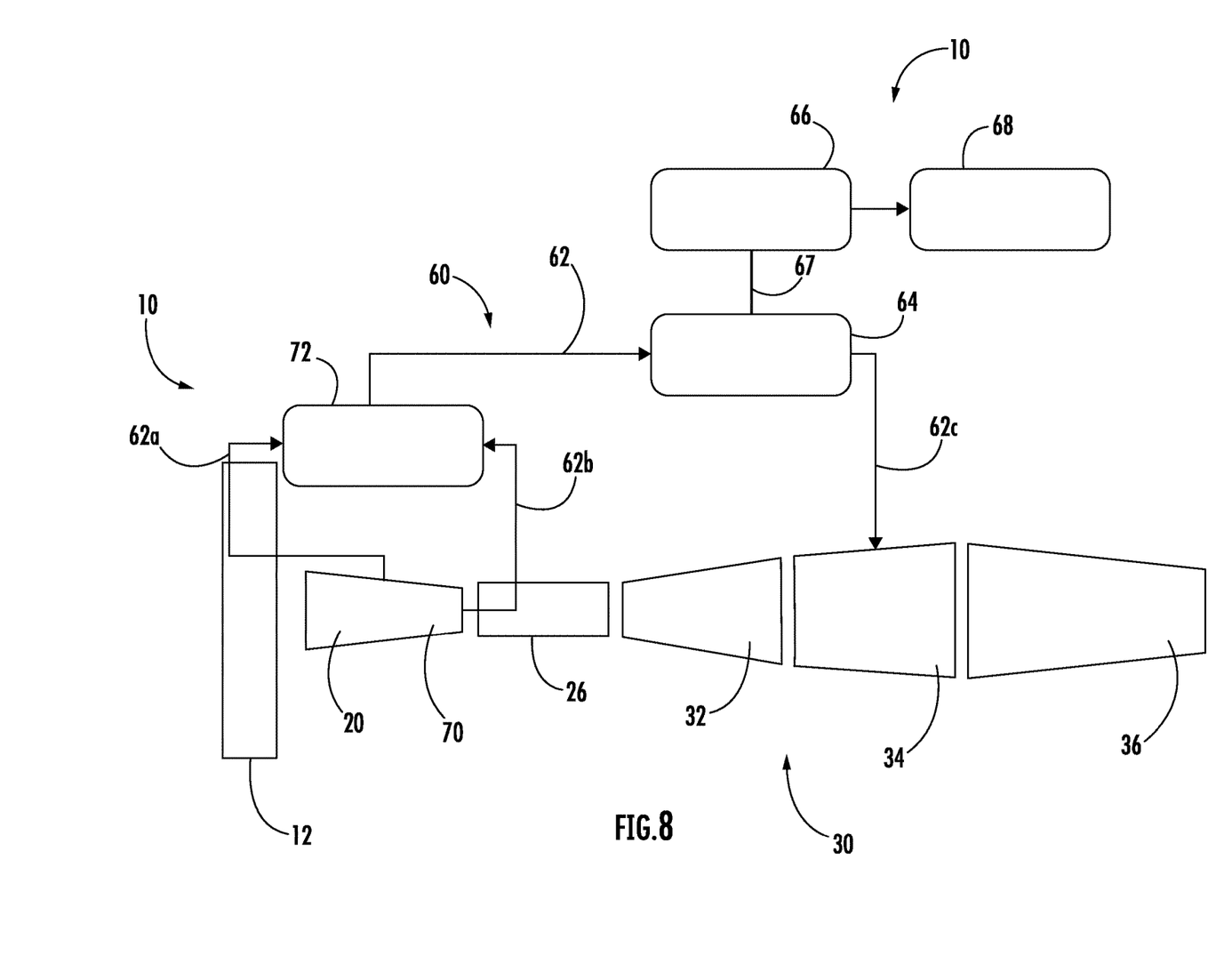
FIGS. 8-9 are schematic embodiments of the power generation system according to aspects of the present disclosure.

Referring now to FIG. 8, another embodiment of the system 60 is provided. The system 60 is configured substantially similarly as depicted and described in regard to FIGS. 2-7. In FIG. 8, the system 60 further includes a flow control device 72 at the bleed circuit 62. The bleed circuit 62 includes a first bleed conduit 62a and a second bleed conduit 62b each extended in fluid communication with the core flowpath 70 to the flow control device 72. The first bleed conduit 62a and the second bleed conduit 62b are separated along the core flowpath 70, such as to allow the respective conduits 62a, 62b to extract the compressed fluid at different pressures. The positioning of the bleed conduits 62a, 62b allows for extracting the compressed fluid at different pressures while operating the engine 10 at a steady-state condition. In one embodiment, the first bleed conduit 62a is configured to receive a flow of compressed fluid at a lower pressure than the second bleed conduit 62b. In still various embodiments, the bleed circuit 62 is extended from the compressor section 20 or the heat addition system 26. In a particular embodiment, the bleed circuit 62 is extended from the heat addition system 26 to receive a non-combusted, compressed flow of fluid from the heat addition system 26.

The flow control device 72 is configured as any suitable valve, manifold system, doors, walls, or other structure for selectively allowing the flow of compressed fluid to the turbine housing 64 from either the first bleed conduit 62a, the second bleed conduits 62b, or both (e.g., as a collector structure). The flow control device 72 may be communicatively coupled to a computing system 210 (FIG. 9) to actively allow or disable the flow of compressed fluid therethrough to the turbine housing 64, such as to allow or disable the turbine rotor 164, and energy generation at the electric machine 66, such as described herein. In other embodiments, the flow control device 72 is a passive apparatus including valves configured to open or close based on the pressure threshold, such as described above in regard to the turbine housing 64.

In various embodiments, the flow control device 72 is any suitable valve or flow actuation device, or any combination thereof, such as, but not limited to, one-way valves, check valves, three-way valves, ball valves, butterfly valves, solenoid valves, pneumatic valves, or other appropriate type valves. In a particular embodiment, the opening pressure of the flow control device 72 corresponds to the pressure threshold at the turbine housing 64.

Figure 6:
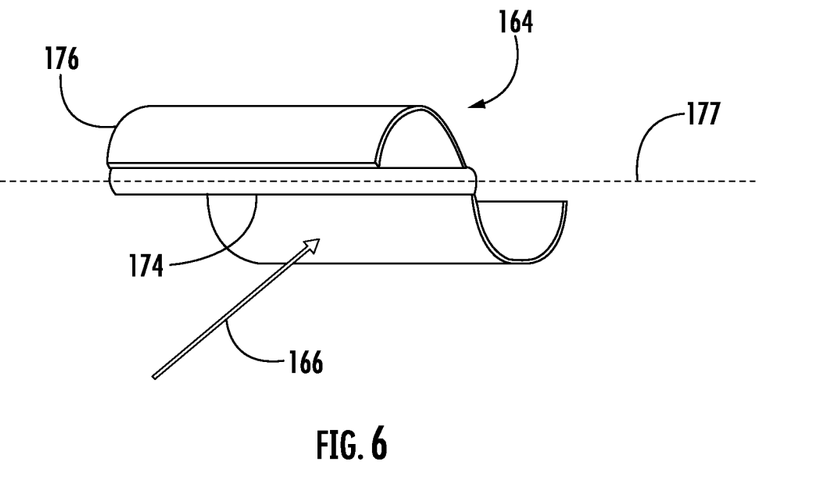
FIGS. 6-7 are embodiments of a turbine rotor of the turbine assembly according to aspects of the present disclosure.

In certain embodiments, the turbine rotor 164 is a transverse-axis turbine or a cross-flow turbine relative to the compressed fluid 166 flowed through the bleed circuit or turbine housing. In still particular embodiments, the turbine is an impulse-type turbine configured to extract kinetic energy from the flow stream of the compressed fluid across the turbine rotor, in contrast to expansion of gases across a turbine rotor. In certain embodiments, the turbine rotor 164 is configured substantially as any appropriate inline turbine, a Darreius turbine, a Savonius turbine, a Pelton wheel, or combinations thereof. Referring now to FIGS. 6-7, exemplary embodiments of transverse-axis or cross-flow turbines are provided. The turbine rotor 164 includes a shaft 174 rotatable about axis 177 around which turbine blades 176 rotate. Embodiments of the turbine depicted and described herein may be more advantageous over other turbine configurations, such as reaction turbines, such as to prevent excessive or undesired pressure losses of the compressed fluid when driving the turbine rotor and electric machine.

Referring back to FIG. 2 and FIG. 8, an energy storage device 68 is operably coupled to receive energy from the electric machine 66. The energy storage device 68 is configured as any suitable battery or capacitor. The electric machine 66 is configured as a motor and/or generator. In other embodiments, the electric machine 66 is configured as a load device generally, such as operably coupled to one or more vehicle subsystems described above.

In various embodiments, the bleed circuit 62 is extended in fluid communication from the turbine housing 64 to the expansion section 30, such as depicted schematically at lines

62c. In a particular embodiment, the bleed circuit 62 is in fluid communication with the low pressure turbine 34 of the expansion section 30. In a still particular embodiment, the bleed circuit 62 is in fluid communication with a cooling circuit at the expansion section 30, such as a secondary flow circuit, an active clearance control (ACC) system, or other cooling structure for gas turbine engines turbines generally known in the art.

Figure 9:
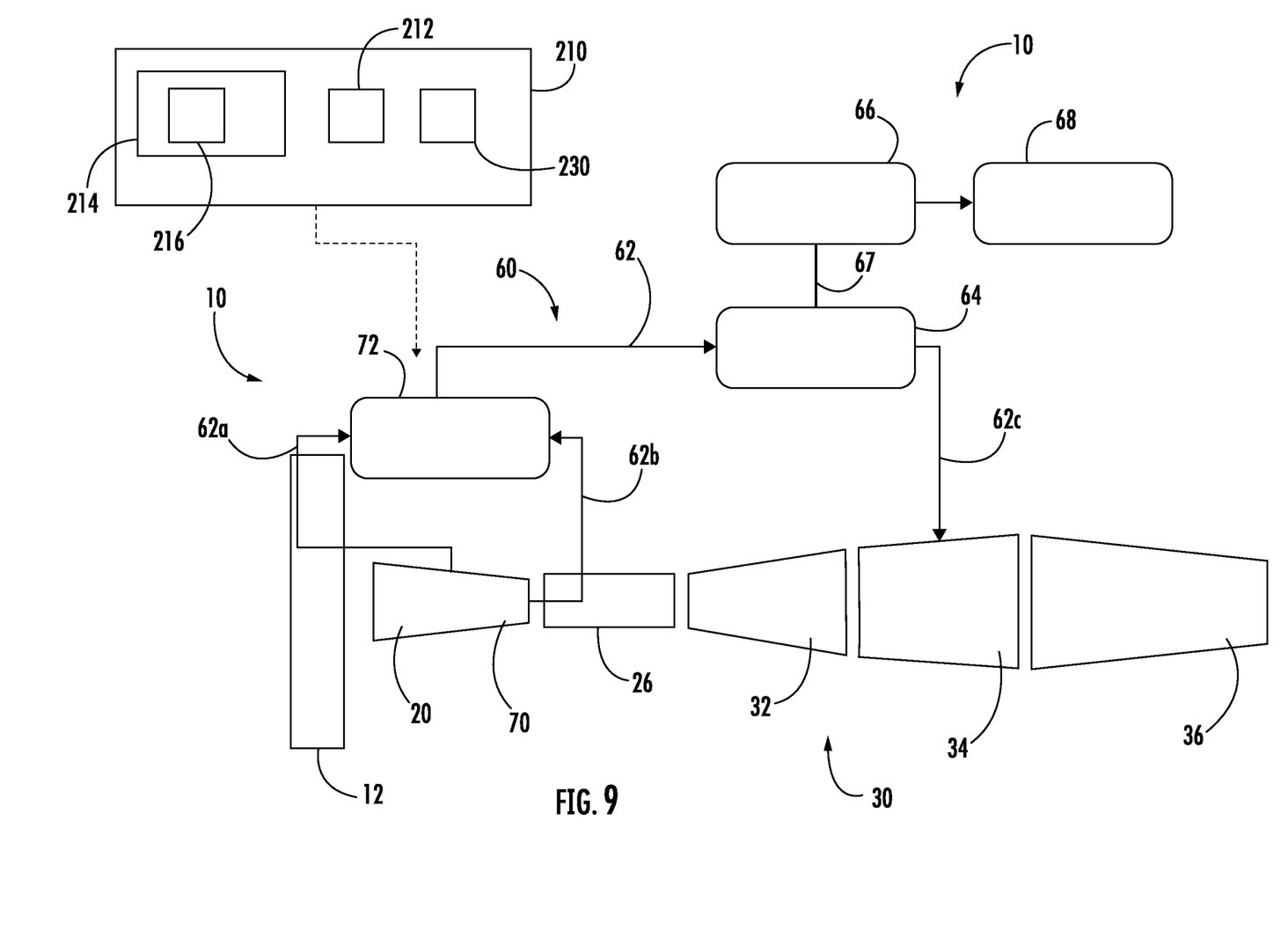

Referring now to FIG. 9, another exemplary embodiment of the engine 10 is provided in accordance with aspects of the present disclosure. The embodiment provided in FIG. 9 is configured substantially similar to the embodiment depicted and described in regard to FIG. 8. In FIG. 9, the system 60 may further include a computing system 210 configured to operate the engine 10 and system 60 such as described herein. The computing system 210 can correspond to any suitable processor-based device, including one or more computing devices, such as described above. In certain embodiments, the computing system 210 is a full-authority digital engine controller (FADEC) for a gas turbine engine, or other computing module or controller configured to execute instructions for operating a gas turbine engine. For instance, FIG. 6 illustrates one embodiment of suitable components that can be included within the computing system 210. The computing system 210 can include a processor 212 and associated memory 214 configured to perform a variety of computer-implemented functions.

As shown, the computing system 210 can include control logic 216 stored in memory 214. The control logic 216 may include instructions that when executed by the one or more processors 212 cause the one or more processors 212 to perform operations. Additionally, the computing system 210 can also include a communications interface module 230. In several embodiments, the communications interface module 230 can include associated electronic circuitry that is used to send and receive data. As such, the communications interface module 230 of the computing system 210 can be used to send and/or receive data to/from engine 10 and the power generation system 60. In addition, the communications interface module 230 can also be used to communicate with any other suitable components of the power generation system 60, such as the flow control device, the electric machine, or the energy storage system.

It should be appreciated that the communications interface module 230 can be any combination of suitable wired and/or wireless communications interfaces and, thus, can be communicatively coupled to one or more components of the power generation system via a wired and/or wireless connection or distributed network. The communications interface module 230 can include any suitable wired and/or wireless communication links for transmission of the communications and/or data, as described herein. For instance, the module 230 can include a SATCOM network, ACARS network, ARINC network, SITA network, AVICOM network, a VHF network, a HF network, a Wi-Fi network, a WiMAX network, a gatelink network, etc.

Embodiments of the computing system 210 may be configured to store and/or execute instructions corresponding to one or more steps of the method 1000, 2000 provided below. The communications interface module 230 may be configured to receive and/or send signals corresponding to operations. Such operations may correspond to steps of the methods provided below, or as generally described above with regard to the system 60. In a particular embodiment, the communications interface module 230 is configured to communicate with the engine 10, the flow control device 72, the turbine housing 64, the electric machine 66, or energy storage device 68. The signals may correspond to a rotational speed of a shaft 67 coupled to the electric machine 66 and turbine rotor 164; an operating state of the electric machine (e.g., energy generation mode, energy discharge mode, energy input speed, output or discharge rate, etc.); or energy storage device 68 state (e.g., charging mode, discharging mode, charge level, temperature, health state, etc.); an open or close position at the bypass wall 166; or a state of the flow control device 72 (e.g., pressure or other physical parameter of the compressed fluid, an open/close or other state indicative of from where the compressed fluid is received at the engine 10), or other appropriate signals for operating the engine 10 and the power generation system 60.

Figure 10:
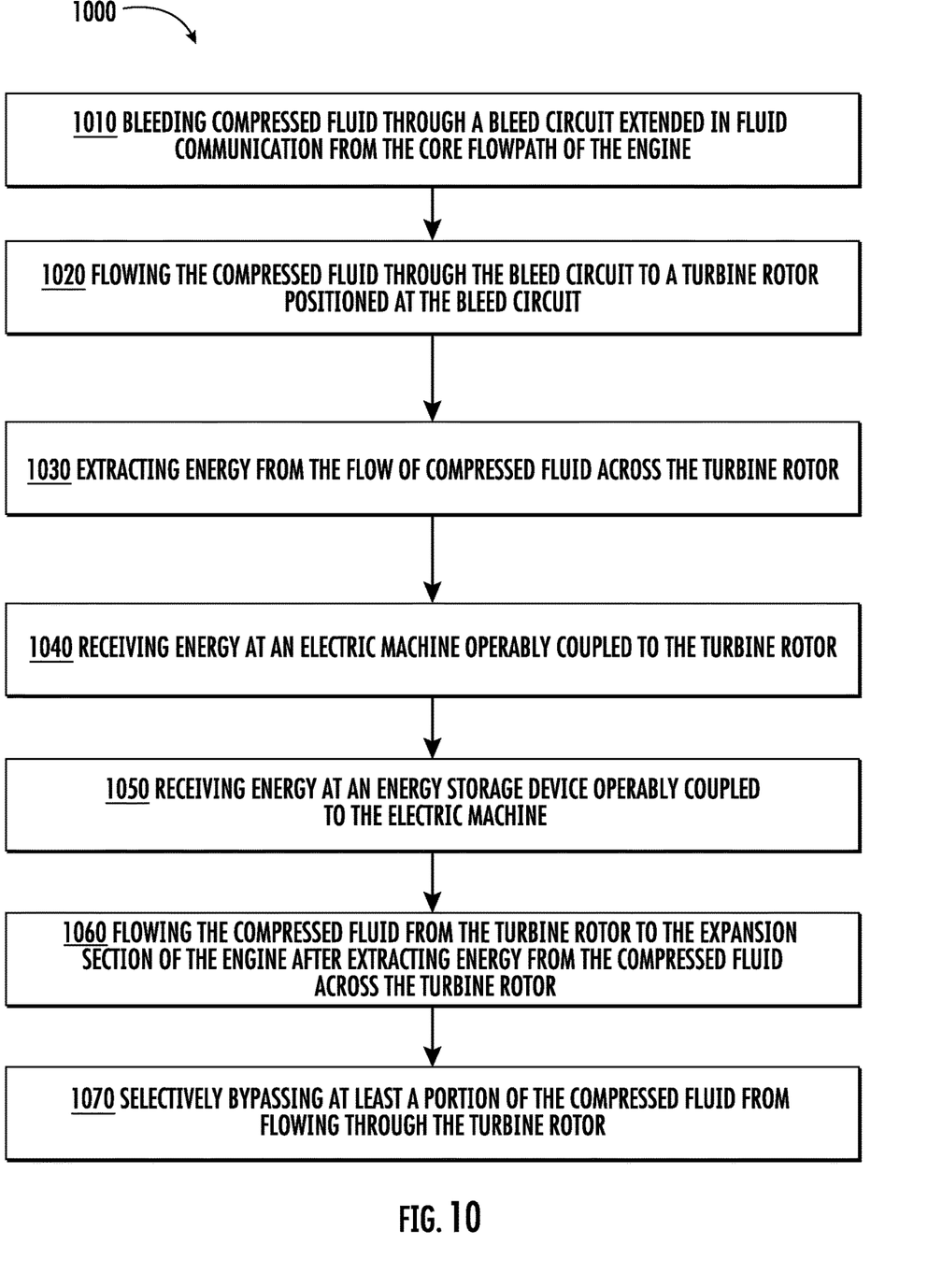
FIG. 10 is a flowchart outlining steps of a method for power generation according to aspects of the present disclosure.

Referring now to FIG. 10 a flowchart outlining steps of a method for power generation is provided (hereinafter, "method 1000"). The method 1000 may be executed by embodiments of the system 60 depicted and described herein in regard to FIGS. 1-9, or other suitable apparatuses. In various embodiments, the method 1000 is implemented and executed at a system including an engine having a core flowpath formed by a compressor section, a heat addition system, and an expansion section in serial flow arrangement, in which a bleed circuit is extended from the core flowpath to extract a portion of compressed fluid from the core flowpath.

The method 1000 includes at 1010 bleeding compressed fluid through a bleed circuit extended in fluid communication from the core flowpath of the engine; at 1020 flowing the compressed fluid through the bleed circuit to a turbine rotor positioned at the bleed circuit; at 1030 extracting energy from the flow of compressed fluid across the turbine rotor; and at 1040 receiving energy at an electric machine operably coupled to the turbine rotor.

In certain embodiments, the method 1000 further includes at 1050 receiving energy at an energy storage device operably coupled to the electric machine.

In still other embodiments, the method 1000 includes at 1060 flowing the compressed fluid from the turbine rotor to the expansion section of the engine after extracting energy from the compressed fluid across the turbine rotor. In one embodiment, flowing the compressed fluid from the turbine rotor is to a low pressure turbine of the expansion section. In another embodiment, flowing the compressed fluid from the turbine rotor to the low pressure turbine is to a cooling circuit at the low pressure turbine.

In an embodiment, extracting energy from the flow of compressed fluid across the turbine rotor includes extracting energy from the flow of compressed fluid across the turbine rotor forming a transverse-axis turbine or a cross-flow turbine relative to the compressed fluid flowed through the bleed circuit.

In various embodiments, bleeding compressed fluid from the core flowpath of the engine includes selectively bleeding compressed fluid from at least two locations separated along the core flowpath, wherein the at least two locations provide different pressures of compressed fluid to the bleed circuit. In one embodiment, bleeding compressed fluid from the core flowpath of the engine is from the compressor section or the heat addition system.

In still various embodiments, the method 1000 includes at 1070 selectively bypassing at least a portion of the compressed fluid from flowing through the turbine rotor. In one embodiment, selectively bypassing at least the portion of the compressed fluid from flowing through the turbine rotor is based on an operating mode of the engine. In a particular embodiment, the operating mode of the engine is based on rotational speed of a high pressure spool formed at least by a high pressure compressor at the compression section and a high pressure turbine at the expansion section. In a still particular embodiment, extracting energy from the flow of compressed fluid across the turbine rotor is at a low pressure operating mode below a pressure threshold, and bypassing at least the portion of the compressed fluid from flowing across the turbine rotor is at a high pressure operating mode at or above the pressure threshold. In certain embodiments, the low pressure operating mode corresponds to startup, ignition, idle, flight idle, or cruise conditions for the engine configured as an aircraft propulsion system. In still certain embodiments, the high pressure operating mode corresponds to takeoff, climb, or approach conditions for the engine configured as an aircraft propulsion system.

Figure 11:
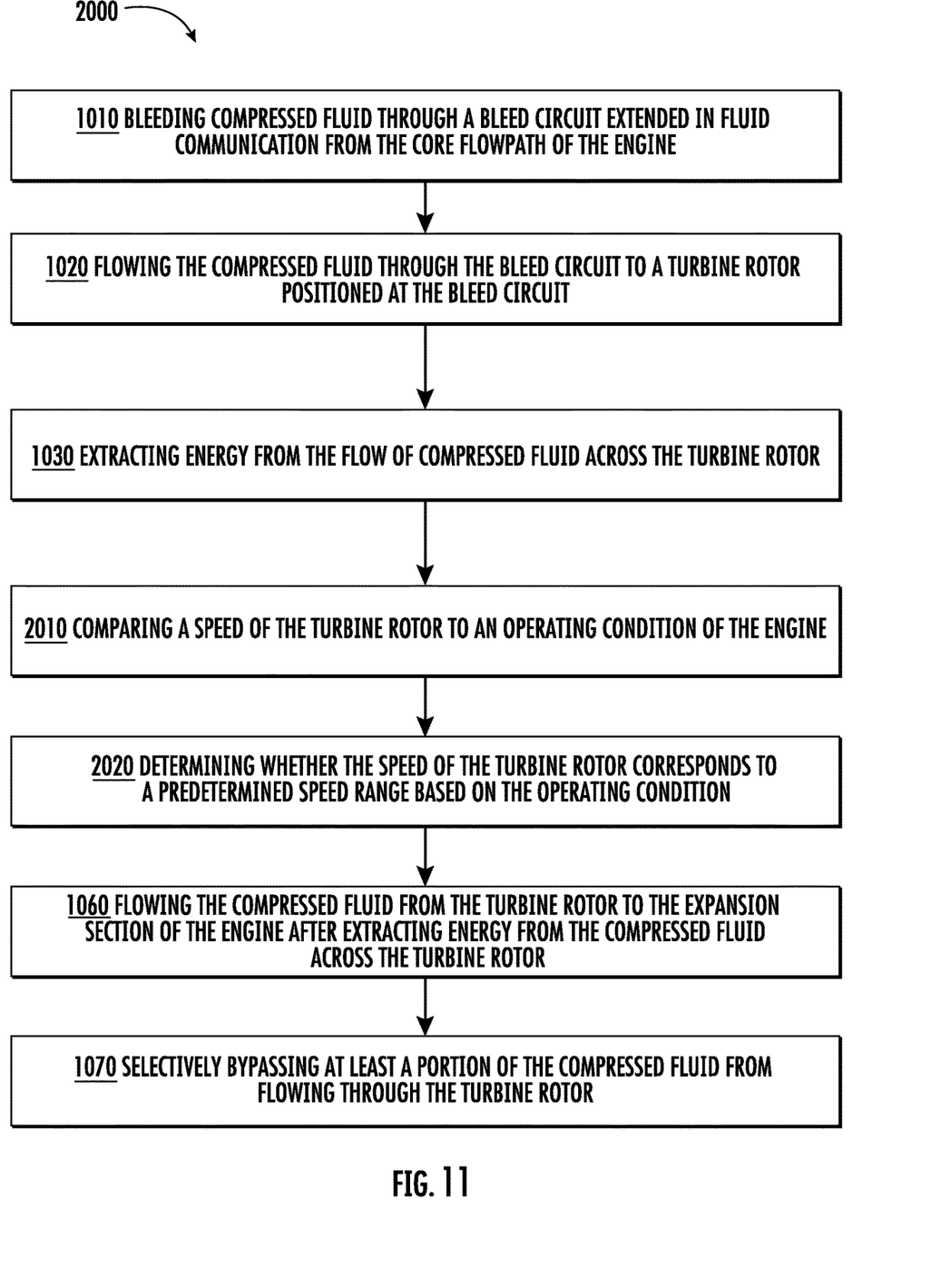
FIG. 11 is a flowchart outlining steps of a method for failure detection according to aspects of the present disclosure.

Referring now to FIG. 11, a flowchart outlining steps for a method for failure detection of a flow circuit is provided (hereinafter, "method 2000"). Embodiments of the method 2000 may be implemented or executed at the system 60 such as described herein, or other appropriate system. Various embodiments of the method 2000 may include one or more steps of the method 1000 outlined herein, or as described with regard to operation of the system 60 described herein.

The method 2000 may include at 2010 comparing a speed of the turbine rotor to an operating condition of the engine; and at 2020 determining whether the speed of the turbine rotor corresponds to a predetermined speed range based on the operating condition. In a particular embodiment, comparing the speed of the turbine rotor to the operating condition of the engine includes comparing the rotational speed of the high pressure spool to the speed of the turbine rotor. The predetermined speed range may include a table, chart, graph, schedule, or other index including a rotational speed of the high pressure spool versus an expected speed of the turbine rotor based on the pressure, flow rate, temperature, or combination of physical characteristics of the compressed fluid through the bleed circuit. If the speed of the turbine rotor is less than the predetermined speed range, this is indicative of losses at the system, such as leaks, cracks, damaged or worn seals, or other failures at the bleed circuit, the flow control device, the compressor section, or the turbine housing, or upstream of the turbine rotor generally.

One or more components of the engine 10 and power generation system 60 described herein may be manufactured or formed using any suitable process, such as an additive manufacturing process, such as a 3-D printing process. The use of such a process may allow such components to be formed integrally, as a single monolithic component, or as any suitable number of sub-components, or at scales and intricacies not previously allowed or conceived in the art. In particular, the additive manufacturing process may allow such component to be integrally formed and include a variety of features not possible when using prior manufacturing methods. For example, the additive manufacturing methods described herein may allow for the manufacture of the turbine rotor 164 at a size and scale suitable for operating the electric machine 66 at the operating conditions described herein. As another example, the additive manufacturing methods described herein may allow for the manufacture of the bypass wall 264 at a size and scale suitable for selectively opening and closing the bypass passage at the turbine housing 62. In further embodiments, the additive manufacturing methods described herein allow for the manufacture of the turbine rotor 164, bypass wall 264, spring 364, turbine housing 64, or the flow control device 72 having unique features, configurations, thicknesses, materials, densities, fluid passageways, headers, and mounting structures that may not have been possible or practical using prior manufacturing methods.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes. Suitable powder materials for the manufacture of the structures provided herein as integral, unitary, structures, or at scales and intricacies provided herein, include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

Although particular embodiments of the system include a flow of compressed fluid as an oxidizer or air from the compressor section, other embodiments may include a flow of lubricant or fuel at a respective lubricant or fuel flow conduit, such as to generate energy at an electric machine such as provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A method for bleed flow power generation for an engine, the engine having a core flowpath formed by a compressor section, a heat addition system, and an expansion section in serial flow arrangement, the engine further having a bleed circuit extended from the core flowpath to extract a portion of compressed fluid from the core flowpath, the method comprising bleeding compressed fluid through a bleed circuit extended in fluid communication from the core flowpath of the engine; flowing the compressed fluid through the bleed circuit to a turbine rotor positioned at the bleed circuit; extracting, via the turbine rotor, energy from the flow of compressed fluid across the turbine rotor; and receiving energy at an electric machine operably coupled to the turbine rotor.

2. The method of any one or more clauses herein, the method comprising receiving energy at an energy storage device operably coupled to the electric machine.

3. The method of any one or more clauses herein, the method comprising flowing the compressed fluid from the turbine rotor to the expansion section of the engine after extracting energy from the compressed fluid across the turbine rotor.

4. The method of any one or more clauses herein, wherein flowing the compressed fluid from the turbine rotor is to a low pressure turbine of the expansion section.

5. The method of any one or more clauses herein, wherein flowing the compressed fluid from the turbine rotor to the low pressure turbine is to a cooling circuit at the low pressure turbine.

6. The method of any one or more clauses herein, wherein extracting energy from the flow of compressed fluid across the turbine rotor comprises flowing the compressed fluid across the turbine rotor forming a transverse-axis turbine or a cross-flow turbine relative to the compressed fluid flowed through the bleed circuit.

7. The method of any one or more clauses herein, wherein bleeding compressed fluid from the core flowpath of the engine comprises selectively bleeding compressed fluid from at least two locations separated along the core flowpath, wherein the at least two locations provide different pressures of compressed fluid to the bleed circuit.

8. The method of any one or more clauses herein, wherein bleeding compressed fluid from the core flowpath of the engine is from the compressor section or the heat addition system.

9. The method of any one or more clauses herein, the method comprising selectively bypassing at least a portion of the compressed fluid from flowing across the turbine rotor.

10. The method of any one or more clauses herein, wherein selectively bypassing at least the portion of the compressed fluid from flowing across the turbine rotor is based on an operating mode of the engine.

11. The method of any one or more clauses herein, wherein the operating mode of the engine is based on rotational speed of a high pressure spool formed at least by a high pressure compressor at the compression section and a high pressure turbine at the expansion section.

12. The method of any one or more clauses herein, wherein extracting energy from the flow of compressed fluid across the turbine rotor is at a low pressure operating mode below a pressure threshold, and wherein bypassing at least the portion of the compressed fluid from flowing across the turbine rotor is at a high pressure operating mode at or above the pressure threshold.

13. The method of any one or more clauses herein, wherein the low pressure operating mode corresponds to startup, ignition, idle, flight idle, or cruise conditions for the engine configured as an aircraft propulsion system.

14. The method of any one or more clauses herein, wherein the high pressure operating mode corresponds to takeoff, climb, or approach conditions for the engine configured as an aircraft propulsion system.

15. The method of any one or more clauses herein, the method comprising pressurizing the flow of compressed fluid via discharging energy from the electric machine to rotate the turbine rotor.

16. A method for failure detection at a flow circuit, the method comprising the method of any one or more clauses herein.

17. A method for failure detection at a flow circuit, the method comprising the method of any one or more clauses herein, the method further comprising comparing a speed of the turbine rotor to an operating condition of the engine; determining whether the speed of the turbine rotor corresponds to a predetermined speed range based on the operating condition.

18. The method for failure detection at a flow circuit of any one or more clauses herein, wherein comparing the speed of the turbine rotor to the operating condition of the engine includes comparing the rotational speed of the high pressure spool to the speed of the turbine rotor.

19. A power generation system, the system comprising an engine comprising a core flowpath formed by a compressor section, a heat addition system, and an expansion section in serial flow arrangement; a bleed circuit extended in fluid communication from the core flowpath of the engine to a turbine housing positioned at the bleed circuit, wherein the bleed circuit is configured to flow a portion of compressed fluid therethrough from the core flowpath, and wherein the turbine housing comprises a turbine rotor; and an electric machine operably coupled to the turbine rotor to receive energy via expansion of the compressed fluid across the turbine rotor.

20. The system of any one or more clauses herein, wherein the turbine rotor comprises a transverse-axis turbine or a cross-flow turbine relative to the compressed fluid flowed through the bleed circuit.

21. The system of any one or more clauses herein, wherein the turbine rotor is a Darreius type turbine rotor, a Savonius-type turbine rotor, or a Pelton wheel.

22. The system of any one or more clauses herein, wherein the turbine housing comprises a bypass wall configured to selectively open and close based on an operating mode of the engine, wherein the bypass wall is configured to extend open to allow the compressed fluid to at least partially bypass the turbine rotor when the operating mode is at or above a pressure threshold, and wherein the bypass wall is configured to extend closed to disable the compressed fluid from bypassing the turbine rotor when the operating mode is below at pressure threshold.

23. The system of any one or more clauses herein, the system comprising an energy storage device operably coupled to receive energy from the electric machine.

24. The system of any one or more clauses herein, wherein the bleed circuit is extended in fluid communication from the turbine housing to the expansion section.

25. The system of any one or more clauses herein, wherein the expansion circuit comprises a cooling circuit, and wherein the bleed circuit is extended in fluid communication from the turbine housing to the cooling circuit at the expansion section.

26. The system of any one or more clauses herein, configured to execute the method of any one or more clauses herein.

27. The system of any one or more clauses herein, wherein the system is configured as a passive system to open or close based on the pressure threshold.

28. The system of any one or more clauses herein, the system comprising a computing system including one or more processors and associated memory configured to perform functions, wherein the memory includes instructions that when executed by the one or more processors causes the one or more processors to perform operations, and wherein the operations comprise one or more steps of the method of any one or more clauses herein.

29. A computer-implemented method for bleed flow power generation for an engine, the method comprising any one or more steps of the method of any one or more clauses herein.

30. A computer-implemented method for bleed flow power generation for an engine, the method comprising providing a flow of fuel to a heat addition system to generate combustion gases; generating combustion gases at the heat addition system of the engine; rotating a high pressure spool based on the combustion gases generated at the heat addition system; bleeding compressed fluid through a bleed circuit extended in fluid communication from a core flowpath of the engine; flowing the compressed fluid through the bleed circuit to a turbine rotor positioned at the bleed circuit; extracting, via the turbine rotor, energy from the flow of compressed fluid across the turbine rotor; and receiving energy at an electric machine operably coupled to the turbine rotor.

31. The computer-implemented method of any one or more clauses herein, the method comprising generating a first signal corresponding to allowing the flow of fuel to the heat addition system.

32. The computer-implemented method of any one or more clauses herein, the method comprising generating a second signal indicative of an operating condition of the engine.

33. The computer-implemented method of any one or more clauses herein, the method comprising discharging energy from the electric machine to rotate the turbine rotor to pressurize the flow of compressed fluid.

34. The computer-implemented method of any one or more clauses herein, the method comprising generating a signal corresponding to discharging energy from the electric machine to rotate the turbine rotor to pressurize the flow of compressed fluid.

35. A computer-implemented method for failure detection at a flow circuit, the method comprising providing a flow of fuel to a heat addition system to generate combustion gases; generating combustion gases at the heat addition system of the engine; rotating a high pressure spool based on the combustion gases generated at the heat addition system; bleeding compressed fluid through a bleed circuit extended in fluid communication from a core flowpath of the engine; flowing the compressed fluid through the bleed circuit to a turbine rotor positioned at the bleed circuit; comparing a speed of the turbine rotor to an operating condition of the engine; and determining whether the speed of the turbine rotor corresponds to a predetermined speed range based on the operating condition.

36. The computer-implemented method for failure detection of any one or more clauses herein, wherein comparing the speed of the turbine rotor to the operating condition of the engine includes comparing the rotational speed of the high pressure spool to the speed of the turbine rotor.

37. The computer-implemented method for failure detection of any one or more clauses herein, the method comprising generating a failure signal corresponding to a failure detection if the speed of the turbine rotor is outside of the predetermined speed range based on the operating condition.

38. The power generation system of any one or more clauses herein, comprising a computing system including one or more processors and associated memory configured to perform functions, wherein the memory includes instructions that when executed by the one or more processors causes the one or more processors to perform operations, and wherein the operations comprise one or more steps of the computer-implemented method of any one or more clauses herein.

39. A power generation system, the system comprising an engine comprising a core flowpath formed by a compressor section, a heat addition system, and an expansion section in serial flow arrangement; a bleed circuit extended in fluid communication from the core flowpath of the engine to a turbine housing positioned at the bleed circuit, wherein the bleed circuit is configured to flow a portion of compressed fluid therethrough from the core flowpath, and wherein the turbine housing comprises a turbine rotor; an electric machine operably coupled to the turbine rotor to receive energy via expansion of the compressed fluid across the turbine rotor; and a computing system including one or more processors and associated memory configured to perform functions, wherein the memory includes instructions that when executed by the one or more processors causes the one or more processors to perform operations, and wherein the operations comprise generating a first signal corresponding to providing a flow of fuel to the heat addition system to generate combustion gases; generating combustion gases at the heat addition system; generating a second signal corresponding to rotating the core engine based on the combustion gases generated at the heat addition system; bleeding compressed fluid through the bleed circuit extended in fluid communication from the core flowpath of the engine; flowing the compressed fluid through the bleed circuit to the turbine rotor positioned at the bleed circuit; extracting, via the turbine rotor, energy from the flow of compressed fluid across the turbine rotor; and receiving energy at an electric machine operably coupled to the turbine rotor.

40. The system of any one or more clauses herein, the operations comprising generating a third signal corresponding to an operating state of the electric machine, wherein the operating state comprises a charge state and a discharge state.

41. The system of any one or more clauses herein, the operations comprising receiving energy at an energy storage device operably coupled to the electric machine; and generating a fourth signal corresponding to a charge stage at the energy storage device.

42. The system of any one or more clauses herein, the operations comprising flowing the compressed fluid from the turbine rotor to the expansion section of the engine after extracting energy from the compressed fluid across the turbine rotor.

43. The system of any one or more clauses herein, wherein flowing the compressed fluid from the turbine rotor is to a low pressure turbine of the expansion section.

44. The system of any one or more clauses herein, wherein flowing the compressed fluid from the turbine rotor to the low pressure turbine is to a cooling circuit at the low pressure turbine.

45. The system of any one or more clauses herein, wherein extracting energy from the flow of compressed fluid across the turbine rotor comprises flowing the compressed fluid across the turbine rotor forming a transverse-axis turbine or a cross-flow turbine relative to the compressed fluid flowed through the bleed circuit.

46. The system of any one or more clauses herein, the operations comprising selectively bleeding compressed fluid from at least two locations separated along the core flowpath, wherein the at least two locations provide different pressures of compressed fluid to the bleed circuit.

47. The system of any one or more clauses herein, the operations comprising generating a fifth signal indicative of from which location along the core flowpath from which compressed fluid is provided to the bleed circuit.

48. The system of any one or more clauses herein, wherein bleeding compressed fluid from the core flowpath of the engine is from the compressor section or the heat addition system.

49. The system of any one or more clauses herein, the operations comprising selectively bypassing at least a portion of the compressed fluid from flowing across the turbine rotor.

50. The system of any one or more clauses herein, wherein selectively bypassing at least the portion of the compressed fluid from flowing across the turbine rotor is based on an operating mode of the engine.

51. The system of any one or more clauses herein, wherein the operating mode of the engine is based on rotational speed of a high pressure spool formed at least by a high pressure compressor at the compression section and a high pressure turbine at the expansion section.

52. The system of any one or more clauses herein, wherein extracting energy from the flow of compressed fluid across the turbine rotor is at a low pressure operating mode below a pressure threshold, and wherein bypassing at least the portion of the compressed fluid from flowing across the turbine rotor is at a high pressure operating mode at or above the pressure threshold.

53. The system of any one or more clauses herein, wherein the low pressure operating mode corresponds to startup, ignition, idle, flight idle, or cruise conditions for the engine configured as an aircraft propulsion system.

54. The system of any one or more clauses herein, wherein the high pressure operating mode corresponds to takeoff, climb, or approach conditions for the engine configured as an aircraft propulsion system.

55. The system of any one or more clauses herein, the operations comprising pressurizing the flow of compressed fluid via discharging energy from the electric machine to rotate the turbine rotor.

56. The system of any one or more clauses herein, the operations comprising generating a sixth signal indicative of the operating mode of the engine.

57. The system of any one or more clauses herein, the operations comprising generating an extraction signal corresponding to the operating mode of the engine being at the low pressure operating mode below the pressure threshold.

58. The system of any one or more clauses herein, the operations comprising generating a bypass signal corresponding to the operating mode of the engine being at the high pressure operating mode.

59. An aircraft comprising the power generation system of any one or more clauses herein.

60. An aircraft configured to execute the method of any one or more clauses herein.

What is claimed is:

1. A method for bleed flow power generation for an engine, the engine having a core flowpath formed by a compressor section, a heat addition system, and an expansion section in serial flow arrangement, the engine further having a bleed circuit extended from the core flowpath to extract a portion of compressed fluid from the core flowpath, the method comprising:
bleeding a compressed fluid through the bleed circuit extended in fluid communication from the core flowpath of the engine;
flowing the compressed fluid across a turbine rotor that is in fluid communication with the bleed circuit;
extracting, via the turbine rotor, energy from the flow of the compressed fluid across the turbine rotor;
receiving energy at an electric machine operably coupled to the turbine rotor; and
detecting failure of the bleed circuit, wherein detecting failure of the bleed circuit comprises:
determining whether the speed of the turbine rotor corresponds to a predetermined speed range based on the operating condition of the engine, wherein failure of the bleed circuit is determined when the speed of the turbine rotor does not correspond to the predetermined speed range based on the operating condition of the engine.

2. The method of claim 1, the method comprising: receiving energy at an energy storage device operably coupled to the electric machine.

3. The method of claim 1, the method comprising: flowing the compressed fluid from the turbine rotor to the expansion section of the engine after extracting energy from the compressed fluid across the turbine rotor.

4. The method of claim 3, wherein flowing the compressed fluid from the turbine rotor is to a low pressure turbine of the expansion section.

5. The method of claim 4, wherein flowing the compressed fluid from the turbine rotor to the low pressure turbine is to a cooling circuit at the low pressure turbine.

6. The method of claim 1, wherein extracting energy from the flow of compressed fluid across the turbine rotor comprises flowing the compressed fluid across the turbine rotor forming a transverse-axis turbine or a cross-flow turbine relative to the compressed fluid flowed through the bleed circuit.

7. The method of claim 1, wherein bleeding compressed fluid from the core flowpath of the engine comprises selectively bleeding compressed fluid from at least two locations separated along the core flowpath, wherein the at least two locations provide different pressures of compressed fluid to the bleed circuit.

8. The method of claim 7, wherein bleeding compressed fluid from the core flowpath of the engine is from the compressor section or the heat addition system.

9. The method of claim 1, the method comprising: selectively bypassing at least a portion of the compressed fluid from flowing across the turbine rotor.

10. The method of claim 9, wherein selectively bypassing at least the portion of the compressed fluid from flowing across the turbine rotor is based on an operating mode of the engine.

11. The method of claim 10, wherein the operating mode of the engine is based on rotational speed of a high pressure spool formed at least by a high pressure compressor at the compression section and a high pressure turbine at the expansion section.

12. The method of claim 11, wherein extracting energy from the flow of compressed fluid across the turbine rotor is at a low pressure operating mode below a pressure threshold, and wherein bypassing at least the portion of the compressed fluid from flowing across the turbine rotor is at a high pressure operating mode at or above the pressure threshold.

13. The method of claim 12, wherein the low pressure operating mode corresponds to startup, ignition, idle, flight idle, or cruise conditions for the engine configured as an aircraft propulsion system.

14. The method of claim 12, wherein the high pressure operating mode corresponds to takeoff, climb, or approach conditions for the engine configured as an aircraft propulsion system.

15. The method of claim 1, the method comprising: pressurizing the flow of compressed fluid via discharging energy from the electric machine to rotate the turbine rotor.

* * * * *